United States Patent [19]
Low et al.

[11] 3,733,463
[45] May 15, 1973

[54] TEMPERATURE CONTROL SYSTEM WITH A PULSE WIDTH MODULATED BRIDGE

[76] Inventors: George M. Low, Acting Administrator of the National Aeronautics and Space Administration with respect to an invention of; Richard C. Heyser, Tujunga, Calif.

[22] Filed: Dec. 24, 1970

[21] Appl. No.: 101,214

[52] U.S. Cl.....................................219/499, 219/50
[51] Int. Cl................................................H05b 1/02
[58] Field of Search....................219/494, 497, 499, 219/501; 317/42; 323/75 H, 75 K

[56] References Cited

UNITED STATES PATENTS

| | | |
|---|---|---|
| 2,819,372 | 1/1958 | Booker et al..........................219/499 |
| 3,526,272 | 9/1970 | Watts et al..........................219/497 X |
| 2,681,431 | 6/1954 | Wannamaker, Jr..................323/75 K |
| 3,159,796 | 12/1964 | Van Sandwyk......................323/75 K |
| 3,546,434 | 12/1970 | Apel..............................219/499 UX |

*Primary Examiner*—Bernard A. Gilheany
*Assistant Examiner*—F. E. Bell
*Attorney*—Monte F. Mott, Paul F. McCaul, John R. Manning

[57] ABSTRACT

A temperature control system is disclosed which includes a modified wheatstone bridge with a resistive-capacitive (RC) circuit in one leg of the bridge. The RC circuit includes a resistor which provides an effective resistance as a function of its absolute resistance and the on-time to off-time ratio of pulses supplied to a switch connected thereacross. A sawtooth voltage is produced across the RC circuit, the voltage being compared with the voltage across a temperature sensor, with heat being applied during each pulse period portion when the sawtooth voltage exceeds the voltage across the temperature sensor.

8 Claims, 2 Drawing Figures

PATENTED MAY 15 1973 3,733,463

RICHARD C. HEYSER
*INVENTOR.*

BY
ATTORNEYS

TEMPERATURE CONTROL SYSTEM WITH A PULSE WIDTH MODULATED BRIDGE

ORIGIN OF THE INVENTION

The invention described herein was made in the performance of work under a NASA contract and is subject to the provisions of Section 305 of the National Aeronautics and Space Act of 1958, Public Law 85–568 (72 Stat. 435; 42 USC 2457).

BACKGROUND OF THE INVENTION

1. Field of the Invention

The present invention generally relates to a temperature regulator and more particularly, to a system for accurately controlling the temperature of an environment within an oven or the like.

2. Description of the Prior Art

A typical temperature control system such as that described in U.S. Pat. No. 3,136,877 consists of a conventional wheatstone bridge circuit. The bridge circuit includes a temperature sensitive resistor located in the environment, whose temperature is to be controlled. When the temperature is too low, a first bridge unbalance condition arises which is detected by a sensor which closes a switch, thereby enabling power to be supplied to a heater which heats up the environment. The environment is heated up until the temperature exceeds a desired nominal temperature. As a result, a second bridge unbalance condition arises, causing the sensor to open the switch and thereby terminate the supply of power to the heater.

With such a prior art system, the environment temperature can only be controlled within a finite significant range, since power supply to the heater occurs whenever the temperature drops below the nominal temperature and is terminated whenever the temperature is above the nominal temperature. Even with sensitive instruments, the temperature range is quite significant, and is often greater than that required for very precise studies or applications, such as in space exploration studies. Thus a need exists for an improved system for accurate temperature control.

OBJECTS AND SUMMARY OF THE INVENTION

It is a primary object of the present invention to provide a new improved temperature control system.

Another object of the present invention is to provide an improved temperature control system which incorporates a novel wheatstone bridge circuit.

A further object of the present invention is to provide a new system which is programmable to control the rise in and the maintenance of an environment temperature.

These and other objects of the present invention are achieved in one embodiment by incorporating in one leg of a wheatstone bridge circuit first and second serially connected resistors, with the second resistor being connected across a switching transistor. The transistor is successively switched between on and off states, during which the second resistor is either shorted out or is in series with the first resistor. During each switching cycle the effective resistance of the second resistor which is in series with the first resistor depends on the ratio of the transistors on-time to off-time. By varying this ratio, namely by pulse width modulating the switching of the transistor, the effective resistance can be changed.

In accordance with the teachings of the present invention, a capacitor is connected across the two resistors. During each switching cycle the voltage across the capacitor which is in the form of a sawtooth is compared with the voltage across the temperature sensor in the bridge. During each cycle, power is applied to a heater only if the capacitor voltage exceeds the temperature sensor in the bridge.

The novel features of the invention are set forth with particularity in the appended claims. The invention will be best understood from the following description when read in conjunction with the accompanying drawings.

DESCRIPTION OF THE PREFERRED EMBODIMENTS

Figure 1:
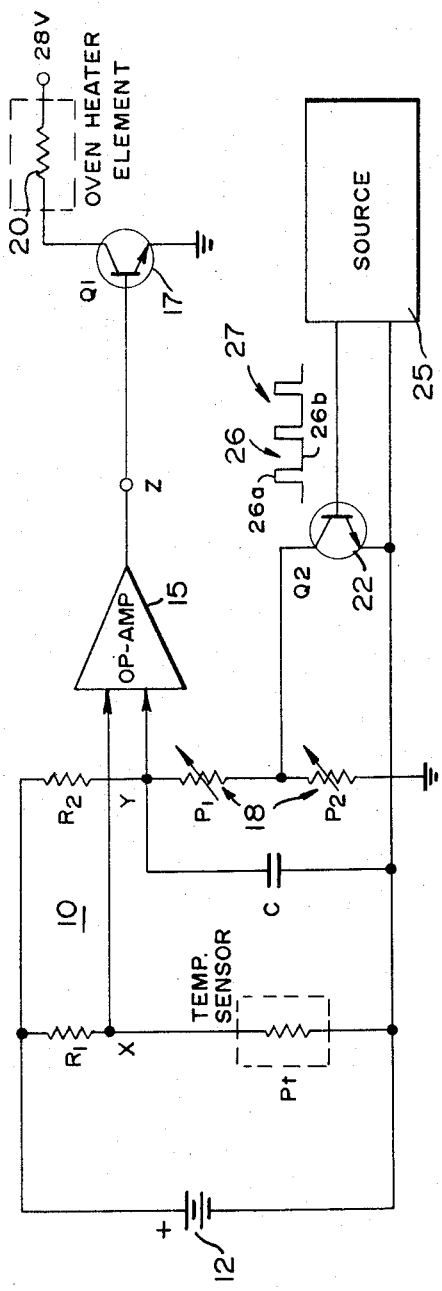
FIG. 1 is a diagram of a basic embodiment of the present invention.

Attention is now called to FIG. 1 which is a combination block and schematic diagram of the present invention. Therein, numeral 10 represents a wheatstone bridge circuit, connected across a source of potential, such as a DC battery 12. The bridge 10 includes a resistor R1 which is connected in series with a temperature sensitive resistor or simply a temperature sensor Pt across the battery 12. It is sensor Pt which is located in the environment or oven whose temperature is to be controlled, and whose resistance varies as a function of temperature. The junction point X between R1 and Pt is connected to one input of an operational amplifier 15. The bridge also includes another resistor R2 which is serially connected with variable resistors P1 and P2 across battery 12. A capacitor C is connected in parallel across P1 and P2 and the junction point Y between R2 and P1 and C is connected to the other input of amplifier 15.

The latter is operated as a comparator to provide an output at point Z of a preselected level which closes a switch 17 only when the voltage at point Y is greater than that at point X. When the switch 17, which is represented in FIG. 1 by a transistor Q1, is closed it connects an oven heater element 20 across a source of potential, shown in FIG. 1 at +28V. Thus, only when switch 17 is closed is heat supplied to the oven by element 20.

As shown in FIG. 1, connected across the resistor P2 is a switch 22, in the form of a transistor Q2, which is activated by pulses such as pulses 26 and 27, from a source 25, which are supplied at a selected rate. Each pulse, such as pulse 26, has an on-time 26a during which the switch is closed so that P2 is shorted out, and an off-time 26b, during which the switch is open so that P2 is not affected. The ratio of on-time to off-time is assumed to be controlled by source 25, which may in turn be controlled by a programmed computer (not shown). The control of the on-time to off-time ratio may be thought of as controlling or modulating the pulse width of each pulse. Therefore, source 25 can be thought of as a source of pulse-width-modulated (PWM) pulses.

In effect, during the on-time of each pulse P2 is shorted out, thus its resistance is zero, neglecting the collector to emitter resistance of Q2. On the other hand, during pulse off-time the full resistance of P2 is in series with P1. Thus, by controlling the on-time to off-time ratio the effective resistance of P2 during the full pulse duration is controlled. For example, if the on-time is only 25 percent of the pulse period, the effective resistance is one-fourth the resistance of P2. On the other hand, if the on-time is half the pulse period, the effective resistance is half the P2 resistance. In practice P1 is selected to equal the resistance of Pt at an ambient temperature, while the effective resistance of P2 is chosen to equal the change (increase) in the resistance of Pt due to a change from the ambient temperature to a chosen temperature to be controlled.

The voltage at point Y changes due to the change in the resistance which P2 provides in series with P1. In the absence of C the voltage at Y would have a square wave shape as shown in line a of FIG. 2. The upper voltage level 31 would be present when Q2 is off and the lower voltage level 32 would be present when Q2 is on and P2 is shorted out. Therein, it is assumed that the off-time to on-time ratio is about 1:3. That is, during each pulse period the transistor Q2 is on for about 75 percent of the period. However, with C in the circuit due to the time constant of the circuit formed by C, P1 and P2, the voltage at point Y during the period of each pulse from source 25 does not have the square wave shape shown in line a but rather the sawtooth shape as shown in FIG. 2, line b and designated $V_X$.

Figure 2:
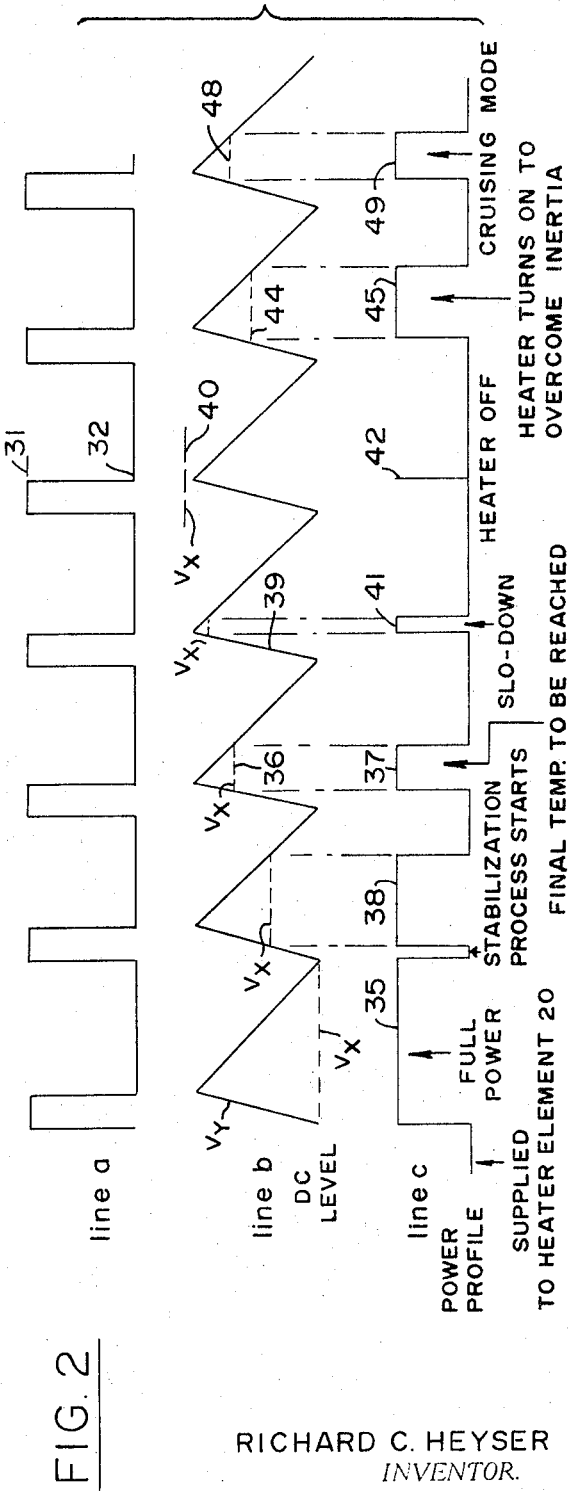
FIG. 2 is a multiline diagram useful in explaining the embodiment shown in FIG. 1.

From the foregoing description it should thus be appreciated that in the present invention, during each pulse period, heat is applied to element 20 only during that portion of the pulse period when the voltage at point X designated in FIG. 2 by the dashed line $V_X$ is less than $V_Y$. Assuming that $V_X$ is less than $V_Y$ during an entire pulse period, power is supplied to heater element 20 during the entire period, as represented by numeral 35 in line c which is used to diagram the power profile supplied to heater element 20, and which corresponds to the output of amplifier 15. On the other hand, if $V_X$ is greater than the maximum value of $V_Y$ during an entire pulse period, the heater element is completely off during the entire period. Thus, the amount or quantity of heat which is supplied by heater element 20 to the oven during each pulse period is a function of the actual oven temperature as represented by $V_X$ and the shape of $V_Y$ which is controllable by the time constant and the pulse width modulation.

From the foregoing it should be appreciated that, assuming a constant pulse frequency, by controlling the pulse width modulation, the rate at which the oven temperature is raised to a desired temperature may be controlled. Furthermore, once this temperature is reached it may be accurately maintained by controlling the pulse width modulation so that during each pulse period only that amount of heat which is necessary to maintain the oven at the desired temperature is provided by heater element 20. Maximum rate of temperature rise may be achieved by making the on-time per pulse period equal to zero thereby raising the level of $V_Y$ to a maximum so that power is supplied to the heater element during the full period of each pulse. The rate at which temperature is increased from a first temperature such as t1 to t2 may be controlled by the pulse width modulation of the pulses to produce a desired rate at which power is supplied to the heater element 20. Once the desired temperature is reached, the pulse width modulation is selected to insure the supply of power per pulse period which is required to maintain the oven at the desired temperature. Experience with the novel invention has demonstrated the ability to control an oven temperature to within less than 0.01°C, e.g., 0.001°C.

Referring again to FIG. 2, let it be assumed that the final desired temperature is that represented by the line 36 for $V_X$ and that the power or heat per pulse needed to maintain that temperature is represented by numeral 37. Let it further be assumed that the oven is below the desired temperature. Thus, more power than is required to maintain the desired temperature is supplied to the heater per pulse, as represented by lines 35 and 38. In practice, the oven temperature may briefly oscillate above and below the desired temperature until the temperature is stabilized. In FIG. 2, lines 39 and 40 represent $V_X$ when the temperature is above the desired temperature. In response to the level represented by line 39, less than the required heat is supplied as represented by line 41. Since level 40 is above the maximum value of $V_Y$ no power is applied to heater element 20 as represented by line 42. Line 44 represents an oven temperature below the desired temperature. Consequently, more power than necessary to maintain the desired temperature is applied as represented by line 45. Lines 48 and 49 respectively, represent $V_X$ at the desired temperature and the power per pulse period needed to maintain the desired temperature.

Although particular embodiments of the invention have been described and illustrated herein, it is recognized that modifications and variations may readily occur to those skilled in the art and, consequently, it is intended that the claims be interpreted to cover such modifications and equivalents.

What is claimed is:

1. A temperature control system comprising:
    a wheatstone-like bridge having first and second parallel legs and including a temperature sensitive element, whose resistance varies as a function of temperature, connected in series with a first bridge resistor in said first leg, and a resistor-capacitor circuit connected in series with a second bridge resistor in said second leg;
    a source of power;
    heating means for providing heat when connected to said source;
    means for applying a voltage across said bridge, whereby the voltages across said element circuit are functions of the resistances thereacross, respectively;
    means coupled to said element and to said circuit for connecting said heating means to said source when the voltage across said circuit is greater than the voltage across said element; and
    control means coupled to said circuit for controlling the resistance across said circuit to vary in a preselected manner during each of a succession of pulse periods with the capacitor of said circuit controlling the voltage of said circuit to vary in a preselected manner from a first level to a second level during a first portion of each pulse period and from said second level to said first level during the rest of the pulse period following said first portion.

2. The arrangement as recited in claim 1 wherein said circuit consists of first and second resistors connected in series and said capacitor is connected in parallel across at least one of said resistors and said control means is coupled to said second resistor and includes first means for shorting out said second resistor during said first portion of each pulse period, with said first portion being selectively variable.

3. The arrangement as recited in claim 2 wherein said control means include second means for providing a succession of equal period pulses, each pulse being of a first level during said first portion of each pulse period and of a second level during the rest of the pulse period, and means for applying said pulses to said first means to short out said second resistor during the first portion of each pulse period.

4. The arrangement as recited in claim 2 wherein said capacitor is connected in parallel across both said first and second resistors, whereby when said second resistor is shorted out the voltage across said capacitor, representing the voltage across said circuit, rises gradually from said first level to said second level and falls gradually from said second level to said first level during the rest of each pulse period when said second resistor is not shorted out, with the voltage across the circuit during each pulse period having the shape of a sawtooth.

5. The arrangement as recited in claim 4 wherein said control means include second means for providing a succession of equal period pulses, each pulse being of a first level during the first portion of each pulse period and of a second level during the rest of the pulse period, and means for applying said pulses to said first means to short out said second resistor during the first portion of each pulse period.

6. In a temperature control system of the type comprising a bridge with a temperature sensitive element whose resistance varies as a function of temperature in one leg of said bridge, said system further including means for comparing the voltage across said element with the voltage across another leg of said bridge, an arrangement comprising:

a resistor having first and second terminals in said other leg;

control means for controlling the resistance across said terminals to vary from the full resistance of said resistor to substantially zero during a selected portion of each of a succession of periods, whereby the effective resistance across said terminals during each period is less than the resistance of said resistor; and a capacitor in said other leg connected in parallel across at least said resistor whereby the voltage across said other leg increases toward a peak value when the resistance across said terminals is the full resistance of said resistor and decreases from said peak value when the resistance across said terminals is substantially zero.

7. The arrangement as recited in claim 6 wherein said control means includes a switch which is connected across said first and second terminals, said switch being switchable to an on state in which said terminals are effectively shorted out and an off state during which the resistance across said terminals is the resistance of said resistor, and source means coupled to said switch means for controlling said switch to be in the on state during a selected portion of each of said periods and in the off state during the rest of each of said periods.

8. The arrangement as recited in claim 7 wherein said source means is a source of a succession of equal period pulses, each pulse being of a first level which switches said switch to its on state during a variably selected period portion and of a second level which switches said switch to its off state during the rest of the pulse period.

* * * * *